US011094215B2

United States Patent
Chen et al.

(10) Patent No.: US 11,094,215 B2
(45) Date of Patent: Aug. 17, 2021

(54) INTERNET-BASED RECORDED COURSE LEARNING FOLLOWING SYSTEM AND METHOD

(71) Applicant: SHENZHEN EAGLESOUL TECHNOLOGY CO., LTD., Shenzhen (CN)

(72) Inventors: Pengyu Chen, Shenzhen (CN); Shanguo Liu, Dalian (CN); Shengqiang Liu, Dalian (CN)

(73) Assignee: SHENZHEN EAGLESOUL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/467,489

(22) PCT Filed: Aug. 25, 2017

(86) PCT No.: PCT/CN2017/099050
§ 371 (c)(1),
(2) Date: Jun. 6, 2019

(87) PCT Pub. No.: WO2018/223529
PCT Pub. Date: Dec. 13, 2018

(65) Prior Publication Data
US 2020/0098282 A1   Mar. 26, 2020

(30) Foreign Application Priority Data
Jun. 8, 2017   (CN) .......................... 201710428830.8

(51) Int. Cl.
*G09B 7/00* (2006.01)
*G06Q 30/02* (2012.01)
*G06Q 50/20* (2012.01)

(52) U.S. Cl.
CPC ........... *G09B 7/00* (2013.01); *G06Q 30/0283* (2013.01); *G06Q 50/20* (2013.01)

(58) Field of Classification Search
CPC .................................. G09B 7/00; G09B 5/00
See application file for complete search history.

(56) References Cited

U.S. PATENT DOCUMENTS

| | | | | |
|---|---|---|---|---|
| 2004/0110119 | A1* | 6/2004 | Riconda | G09B 7/02 434/350 |
| 2009/0017433 | A1* | 1/2009 | Belsky | G09B 7/00 434/362 |
| 2016/0117943 | A1 | 4/2016 | Rao | |

FOREIGN PATENT DOCUMENTS

| | | |
|---|---|---|
| CN | 101833882 | 9/2010 |
| CN | 103002054 | 3/2013 |

(Continued)

OTHER PUBLICATIONS

Internation Search Report of PCT/CN2017/099050.
Written Opinion of PCT/CN2017/099050.

*Primary Examiner* — Omkar A Deodhar
(74) *Attorney, Agent, or Firm* — Dragon Sun Law Firm, PC; Jinggao Li, Esq.

(57) ABSTRACT

There are provided a teaching recording/broadcasting system and method for follow-up learning. Based on an Internet teaching platform, a learning data record table is formed by recording process learning data of a user, including learning contents, starting time and ending time, a duration, operating actions, after-class exercises, and answer results; With many ways, such as real-time, delayed or post-event ways, a common user can carry out follow-up learning on a local terminal device according to information, such as the time, sequence and content, recorded in the learning data record table of the particular user; on this basis, through comparison of process learning data before and after follow-up (Continued)

learning of the follow-up learner for a period of time, especially the calculation of a follow-up degree, it is confirmed whether the learning is effective follow-up learning; and the specific user is motivated according to data of the effective follow-up learning.

14 Claims, 3 Drawing Sheets

(56) References Cited

FOREIGN PATENT DOCUMENTS

| | | |
|---|---|---|
| CN | 103295171 | 9/2013 |
| CN | 105306861 | 2/2016 |
| CN | 105447793 A | 3/2016 |
| CN | 105448153 A | 3/2016 |
| CN | 105488055 A | 4/2016 |
| CN | 105825454 A | 8/2016 |
| CN | 106355350 | 1/2017 |

* cited by examiner

INTERNET-BASED RECORDED COURSE LEARNING FOLLOWING SYSTEM AND METHOD

CROSS-REFERENCE TO RELATED APPLICATIONS

This application is a national stage application of PCT Application No. PCT/CN2017/099050. This Application claims priority from PCT Application No. PCT/CN2017/099050, filed Aug. 25, 2017, and CN Application No. 201710428830.8, filed Jun. 8, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention relates to the technical field of Internet teaching, and in particular to an Internet teaching recording/broadcasting system and method for follow-up learning.

BACKGROUND ART

The development of Internet technologies has brought about huge changes to education. Network technologies have enabled the distance in space to be narrowed continuously and made the sharing of teaching resources more convenient. Audio/video content of sites, such as classroom teaching, lectures, and meetings, or even the content of integrated demonstrations are made into a multimedia form which is stored on a teaching server connected to the Internet, and with the aid of on-demand and live broadcasting technologies, a user can learn on-line or review teaching content anytime and anywhere through the Internet. With the aid of increasingly popular networks, especially mobile Internet, through various types of networks, the users can conveniently carry out on-line teaching, remote teaching, classroom live broadcasting and so on. An on-line live broadcasting and recording/broadcasting system not only needs to record video and audio of teaching, lectures and meetings, but also needs to integrate same with demonstration content, which requires relatively complex devices and interactive cooperation.

A series of teaching recording/broadcasting systems or smart campus systems are proposed in the prior art, for example: as shown in FIG. 1, CN 101833882 A (date of publication: 15 Sep. 2010) discloses a course recording system for use in teaching, including a multimedia classroom module 103 (such as a platform, a center control, a booth, a notebook computer, a projector, and the like), a classroom scene camera acquisition module 102, an automatic tracking detecting module 101, a recording/broadcasting workstation 104, a B/S architecture on-demand broadcasting module 107, an editing workstation 105, a recording/broadcasting system resource management module 106, external conditions, and the like.

CN 106355350 A (date of publication: 25 Jan. 2017) discloses a smart campus system comprising a campus management subsystem 1 and a campus teaching subsystem 2, wherein a smart reading assessment subsystem can perform analysis, calculation and ranking according to the received data, such as the frequency and time of students going in and out of a reading room, and the name and number of books read by the students, and then present a ranking list on a cloud interactive electronic blackboard 108, so as to motivate students to learn enthusiastically.

CN 105306861 A (date of publication: 3 Feb. 2016) discloses a reliable systematic teaching recording/broadcasting method, comprising recording data by category and separately storing same by category, generating uniform time stamps for marking, simply segmenting data needing to be encrypted, establishing a table of correspondence relationships, obtaining recorded data separately as needed, and achieving smooth data transfer, and by combining these pieces of data using a client on a local terminal, the method may even obtain only part of the data for broadcasting according to the needs of the client, thereby systematically solving the problem of teaching recording/broadcasting.

CN 103295171 A (date of publication: 11 Sep. 2013) discloses an automatic S-T teaching analysis method based on an intelligent recording/broadcasting system, wherein the system comprises an audio/video site-acquisition and recording/broadcasting system, a network transmission system and a remote broadcasting system, the method comprising the following steps: I. obtaining a switching mode of signal sources during recording by the audio/video site-acquisition and recording/broadcasting system; II. performing conversion processing on the switching mode and generating an xml file; III. defining parameters in a video source file of the xml file as behaviors of a teacher and students; IV. calculating the percentage of the teachers behaviors, the percentage of the students' behaviors and a conversion rate; and V. presenting an S-T behavior diagram using a web interface. This invention can realize the following effect: at the same time that a course given by the teacher is recorded, by converting intelligent switch information about video source locations into a teacher behavior information sequence table and a student behavior information sequence table, and after the recording of video is completed and through automatic coding, a recording/broadcasting host can generate an intuitive S-T histogram, calculate the conversion rate of this case study, and determine the teaching type according to norms.

In the prior art, the teaching recording/broadcasting system focuses on the recording of the whole teaching process, which can be recorded through a variety of data streams, such as audio, video and demonstrations (actions), and which aims to reproduce the teaching process. However, in the traditional learning process, it is recognized that a good learning method is an important guarantee for improving academic performance. Different students are searching for the most suitable learning methods for themselves, and in addition to intuitively imitating their classmates with good academic performance, students can only learn about a learning method from an excellent learner through relatively abstract means such as face-to-face communications and introductions of learning experiences; however, it is substantially impossible for them to master his or her learning process, which confuses many learners. Regardless of how many and how good the learning methods they have been introduced to, they still have no idea how to conduct their own studies.

In the traditional teaching mode, in general, there are few effective ways to solve such problems, except through the learners' self-consciousness and exploration. In real life, there is still an effective way, which, however, is difficult to maintain in modern society, that is, two learners learn together all the time, especially during the time after class, with one learner keeping pace with the other leaner with the better academic performance, which is usually especially helpful for the former to improve his or her academic performance. However, in the Internet era, there are many methods and systems for sharing a variety of types of information, for example.

CN 103002054 A (27 Mar. 2013) discloses a network-based notes sharing method, comprising the following steps: a. receiving and saving, by a cloud server, at least one note for text information, and information about the location of the text information and the at least one note in a document corresponding to the text information, which are sent by a mobile terminal; b. receiving, by the cloud server, a note query request of a user for the text information; c. querying, by the cloud server, according to the note query request so as to obtain the corresponding note; and d. sending, by the cloud server, the corresponding note to the user. The cloud server carries out querying according to the text information by means of a fuzzy matching algorithm so as to obtain the corresponding notes, and the cloud server displays each of the notes in the sharing mode, together with account information about each of the notes, to the user.

However, with regard to the Internet-based teaching recording/broadcasting system, although the object thereof is also to share teaching resources, no such inventive concept has been disclosed or suggested in prior art: wherein some of the data of a user during a learning process of teaching resources is recorded again, and a learning data record table is formed, so that a common user can learn according to the learning data record table during the learning process of the teaching resources, and through the comparison of the learning data, differences between different users can be found so as to promote the improvement in the learning efficiency. Although, in the prior art, the user can use the teaching recording/broadcasting system to review the courses on demand, this process is still a state of self-learning. The user often does not know how to control their progress to learn better, or how other users who study better learn.

The present invention is directed at the problem in the prior art that the learning process cannot be shared. By combining the Internet teaching platform to utilize the advantages of Internet teaching, especially in the stage of self-learning after class, the present invention enables, from a technical perspective, the user to keep pace with better learners at any time or to learn according to their learning process through sharing the learning process or through synchronous learning. Through the calculation of a follow-up degree, and in combination with the change in the academic performance, it is determined whether the follow-up is an effective follow-up, so as to further help the student to develop good learning habits with the aid of the system of the present invention.

Therefore, a heretofore unaddressed need exists in the art to address the aforementioned deficiencies and inadequacies.

SUMMARY OF THE INVENTION

In order to solve the above technical problem, according to an aspect of the present invention, an Internet-based teaching recording/broadcasting method is provided, comprising the following steps:

a data recording step for recording learning data of a particular user during a learning process when using the Internet-based teaching recording/broadcasting system to carry out on-demand review learning. These pieces of learning data include, but are not limited to, learning content, starting time and ending time, a duration, time distribution and answer results, etc. It is recommended to include at least two or three of these types of information, particularly to include time information, and more preferably to include all of these pieces of information above, and even other possible pieces of recordable learning data. The learning data may also comprise learning annotations, the learning annotations being information, such as marks, texts or patterns, recorded by the user at corresponding locations during the learning process, and the learning annotations comprising the information, such as marks, texts or patterns, or audio information as well as location information corresponding to these pieces of information, wherein these learning annotations can be displayed, to the common user who is carrying out the follow-up learning, at appropriate locations, such as the same locations as the annotation information, according to the location information. Preferably, for example, for listen-and-repeat practices, or exercises or practices that require a voice response, these pieces of information for the particular user are also recorded and can then be sent to the common user. The common user can compare same with not only the standard answer, but also with the audio of the particular user, so as to perceive the difference between same.

A record forming step for forming, from the relevant learning data recorded in the data recording step, a learning data record table that can be invoked and executed, and storing same on a server such as an Internet teaching server, wherein the learning data record table can also be stored on a local teaching server or on a local area network teaching server, etc.; and the learning data record table may be a usable spreadsheet, such as an XML, identified in chronological order.

A follow-up learning step for providing the real time, delayed or post following up of the learning data record table to the common user. The common user can perform follow-up learning according to the relevant learning data recorded in the learning data record table. Preferably, the relevant learning data recorded in the data recording steps can be shared synchronously to the common user so that the common user can carry out follow-up learning in real time; the follow-up learning data can be moderately delayed so that the common user can carry out follow-up learning; alternatively, after the particular user completes learning, a complete learning data record table is formed, and then the common user performs follow-up learning.

Preferably, the particular user in the data recording step is a particular user whose learning method or academic performance is worth others learning, borrowing or following. The particular user can be determined using empirical data, such as empirical data designated by teachers, selected by common users, self-recommended by users, or determined by historical data statistics, such as those recommended by analyzing historical learning records, wherein same are generally users with good academic performances and/or high learning efficiencies. In a preferred case, the recording/broadcasting system performs statistical analysis according to the past learning records and academic performances, screens out those excellent users to form an excellent user recommendation list, and takes these excellent users as particular users. When these users log into the recording/broadcasting system for learning, their learning data can be recorded to form a learning data record table. Preferably, a particular user confirmation step is included: confirming the identity of a particular user based on historical data or empirical data after comparison with a set threshold. The learning record table of the particular users will be saved in recorded-for-broadcast data together with the recorded-for-broadcast courses they have learned, so that a common user can select, according to the matching of information, a particular user he or she wants to follow so as to carry out learning when reviewing the recorded-for-broadcast courses on demand.

In practical applications, the so-called logging into the recording/broadcasting system for learning mainly refers to the user's self-learning after class, such as on-demand reviewing of the recorded-for-broadcast courses, especially the after-class review, out-of-class learning, etc., which has more practical significance for follow-up learning, because the learning in class is basically simultaneous and synchronous for everyone, and generally there is no need for follow-up learning. The main purpose of the present invention is to solve the problem of follow-up learning in self-learning out of class; however, this does not exclude follow-up learning in class, for example, a certain user in a class learns from particular users in other classes through the Internet-based teaching recording/broadcasting system.

For a user who wants to look for a follow-up learning object, he or she only needs to fill in or input his or her own requirement information through the Internet-based teaching recording/broadcasting system, such as the personal information, learning stage, learning progress, academic performance, hobbies and so on, then the system matches these pieces of information with the conditions of particular users, thus generating a recommendation list from which the user can select at least one particular user to learn from him or her according to his or her learning record table. Preferably, when making a selection, the recommendation list generated by the system can be sent to the user, a third party user related to the user, such as his or her teacher or parents, or a common user who is selected by the user and from whom the user wishes to get help in making a decision, such as a classmate or a friend, and the selection can be made with the help of the third party.

The recording/broadcasting method of the present invention further comprises a learning record evaluation step for evaluating the learning data record table by the common user according to the common user's own feelings after completing the learning according to the learning data record table. The evaluation can be a score or a star grade, but also can be a text, audio or video evaluation. These evaluations can be fed back to the particular user, and the particular user can choose to browse or view these pieces of information. Preferably, relevant learning data, such as the situation of solving exercises, of the user who performs follow-up learning also can be sent to the particular user to enable the particular user to know his or her own advantages, thus helping him/her to define their goals for further improvement.

The recording/broadcasting method of the present invention further comprises a follow-up learning comparison step for forming, by the common user, his or her own learning data record table after completing the follow-up learning according to the learning data record table, and by performing comparison of learning data with the learning data record table of the particular user for which the follow-up learning is carried out, differences from the particular user, such as the overall difference in learning times taken to complete the same learning content, the difference in the time distribution for completing various different parts of the learning content, the difference in accuracies after completing the same exercises practice, the difference in particular wrongly-answered exercises, etc.; and a follow-up degree calculation step for obtaining a follow-up degree parameter with respect to the learning data of the particular user through analysis of the learning effect evaluation of the common user within a period of time, and determining whether the follow-up learning is an effective follow-up in combination with a change in the academic performance of the common user during this period of time.

The follow-up degree calculation step is used for determining the follow-up learning to be an effective follow-up if the follow-up degree parameter continually gets better and the academic performance continually gets better, otherwise, determining the follow-up learning to be a non-effective follow-up, and when determining the follow-up to be the non-effective follow-up, providing a suggestion to replace the follow-up for the common user.

The follow-up degree parameter is calculated according to the following equation, $$S = 1 - \sum_{i}^{n} \left( \delta_1 \left( \frac{|T_1 - t_1|}{T_1} \right) + \ldots + \delta_i \left( \frac{|T_i - t_i|}{T_i} \right) \right),$$

i=1, 2, 3, . . . , n, where n is a positive integer representing the $i^{th}$ marked event in the learning data record table, T represents the corresponding time of the $i^{th}$ marked event in the learning data record table of the particular user, t represents the corresponding time of the $i^{th}$ marked event in the learning data record table of the common user, and δ represents the weight coefficient of the $i^{th}$ marked event, where $\delta_1 + \ldots + \delta_i = 1$, with the marked event being an event such as learning a page, pausing, returning, solving exercises and so on.

Before the follow-up learning is started, a certain amount of fees are paid in advance according to an agreement of an offer, and after the period of time of the follow-up learning is completed, an actual payment will be incurred in the case where the learning is determined to be effective follow-up learning, while a small amount of payment will be incurred in the case of non-effective follow-up learning.

The method further comprises a strengthening exercises recommendation step for recommending, according to the topic of the wrongly-answered exercises with a difference, strengthening exercises on the same topic to the common user, so that the common user can strengthen their practice through the strengthening exercises. The recording/broadcasting system of the present invention will make the recommendation according to the difference in the wrongly-answered exercises, such as some of the wrongly-answered exercises that the particular user did not answer wrongly but the common user answered wrongly, while wrongly-answered exercises that both the particular user and the common user answered wrongly can be left aside temporarily, which mainly reflects the limit of the learning goal here, and for content that the student with the better academic performance has not grasped, the common user, as a follower, may temporarily pay no attention to this, and priority should be given to solving the current differences, so that relevant types of exercises for which the learning should be strengthened are recommended to the common user.

According to another aspect of the present invention, a recording/broadcasting system for Internet teaching is provided for performing each step of the above recording/broadcasting method.

According to another aspect of the present invention, a computer device is provided, comprising a memory, a processor, and a computer program stored on the memory and operable on the processor, wherein the program, when executed by the processor, can implement the steps of the method as described above.

According to a still further aspect of the present invention, a computer storage medium is provided, which stores a program which can be executed by a computer, wherein the program, when executed, can implement the steps of the method as described above.

In the Internet-based teaching recording/broadcasting system in the present invention, through the recording and sharing, by a particular user, of the process learning data of the recorded-for-broadcast courses, the problem that follow-up learning cannot be carried out among users in the process of reviewing the recorded-for-broadcast courses is solved, thereby helping to share learning methods among users, helping users to develop good learning habits, and helping users to improve their learning efficiencies.

Additional aspects and advantages of the present invention will be given in part in the description below and will become apparent in part from the description below or be known from embodiments or examples of the present invention.

BRIEF DESCRIPTION OF THE DRAWINGS

The above additional aspects and advantages of the present invention will become obvious and easy to understand from the following description combined with the attached drawings, in which.

DETAILED DESCRIPTION

The detailed description of the present invention will be further described in detail below in conjunction with the drawings.

Figure 1:
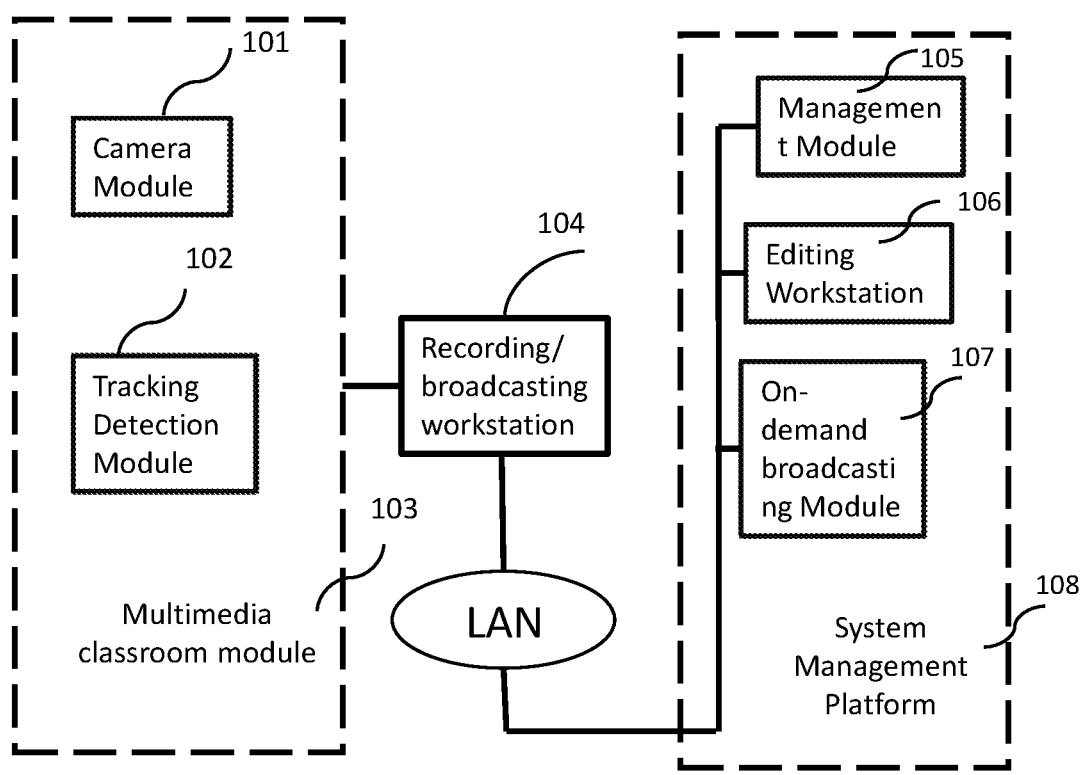
FIG. 1 is a schematic view of an architecture of a course recording system in the prior art.
Figure 2:
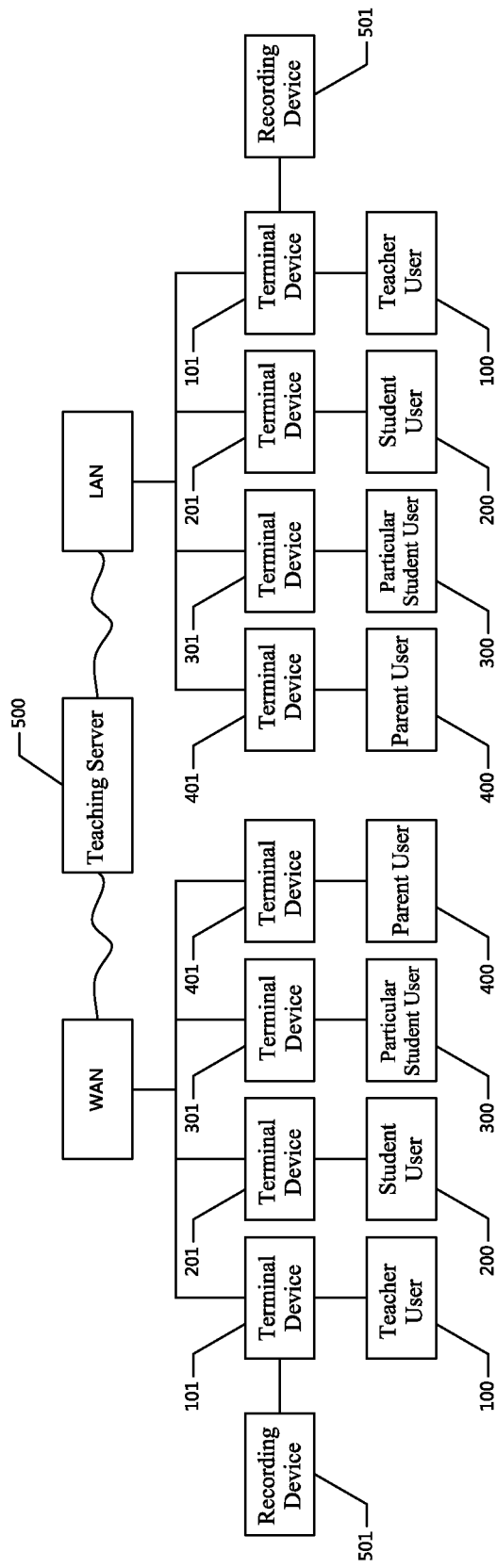
FIG. 2 is a schematic view of an architecture of an Internet-based recording/broadcasting system of the present invention.

FIG. 2 is a schematic view of an architecture of an Internet-based recording/broadcasting system of the present invention. As shown in FIG. 2, various users include a teacher user 100, a student user 200 (hereinafter referred to as a user 200), a specific student user 300 (hereinafter referred to as a particular user 300), a parent user 400, etc., who are connected to a teaching server 500 (which can be a local teaching server, a local area network teaching server, a remote teaching server, a cloud teaching server, etc.) via the Internet through user terminals 101, 201, 301 and 401 installed with software clients, respectively. The teacher user 100 can carry out Internet-based teaching activities by connecting the user terminal 101 to a recording device 501 of a multimedia class and can realize the task of recording the multimedia class.

The user terminal of the present invention comprises: a processor, a network module, a control module, a display module, an intelligent operating system. The user terminal can be provided with a variety of data interfaces for connecting to various extension devices and accessories via a data bus. The intelligent operating system comprises Windows, Android and its improvements, and iOS, on which application software can be installed and run, and the functions of various types of application software, services, and application program stores/platforms under the intelligent operating system are realized.

The user terminal of the present invention can be connected to the Internet through connection manners, such as RJ45/Wi-Fi/Bluetooth/2G/3G/4G/G.hn/Zigbee/Z-ware/RFID, and can be connected to other terminals or other computers and devices via the Internet. By using a variety of data interfaces or bus modes, such as 1394/USB/serial/SATA/SCSI/PCI-E/Thunderbolt/data card interface, and by using a connection mode like an audio and video interface such as HDMI/YpbPr/SPDIF/AV/DVI/VGA/TRS/SCART/Displayport, various extension devices and accessories are connected to constitute a conference/teaching device interaction system. The functions of acoustic control and shape control are realized by using a sound capture control module and a motion capture control module in the form of software, or by using a sound capture control module and a motion capture control module in the form of data bus on-board hardware. The display, projection, voice access, audio and video playing, as well as digital or analog audio and video input and output functions are realized by connecting to a display/projection module, a microphone, a sound device and other audio and video devices via audio and video interfaces. The image access, sound access, use control and screen recording of an electronic whiteboard, and an RFID reading function are realized by connecting to a camera, a microphone, the electronic whiteboard and an RFID reading device via data interfaces, and a mobile storage device, a digital device and other devices can be accessed and managed and controlled via corresponding interfaces. The functions including manipulation, interaction and screen shaking between multi-screen devices are realized by means of DLNA/IGRS technologies and Internet technologies.

In the present invention, the processor is defined to include but not limited to: an instruction execution system, such as a computer/processor-based system, an application specific integrated circuit (ASIC), a computing device, or a hardware and/or software system capable of fetching or acquiring logic from a non-transitory storage medium or a non-transitory computer readable storage medium and executing instructions contained in the non-transitory storage medium or the non-transitory computer readable storage medium. The processor may further comprise any controller, state machine, microprocessor, Internet-based entity, service or feature, or any other analog, digital, and/or mechanical implementation thereof.

In the present invention, the computer readable storage media is defined to include but not limited to: any medium capable of containing, storing, or holding programs, information, and data. The computer readable storage media comprises any one of many physical media such as, electronic media, magnetic media, optical media, electromagnetic media, or semiconductor media. The more specific examples of a suitable computer-readable storage medium and a memory used by the user terminals and the servers includes but not limited to: a magnetic computer disk (such as a floppy disk or a hard drive), a tape, a random access memory (RAM), a read-only memory (ROM), an erasable programmable read-only memory (EPROM), a compact disc (CD) or a digital video disc (DVD) and a blue ray memory, a solid-state disk (SSD), a flash memory.

In the present invention, the Internet may comprise a local area network and a wide area network, and may be a wired Internet and may also be a wireless Internet, or any combination of these networks.

Figure 3:
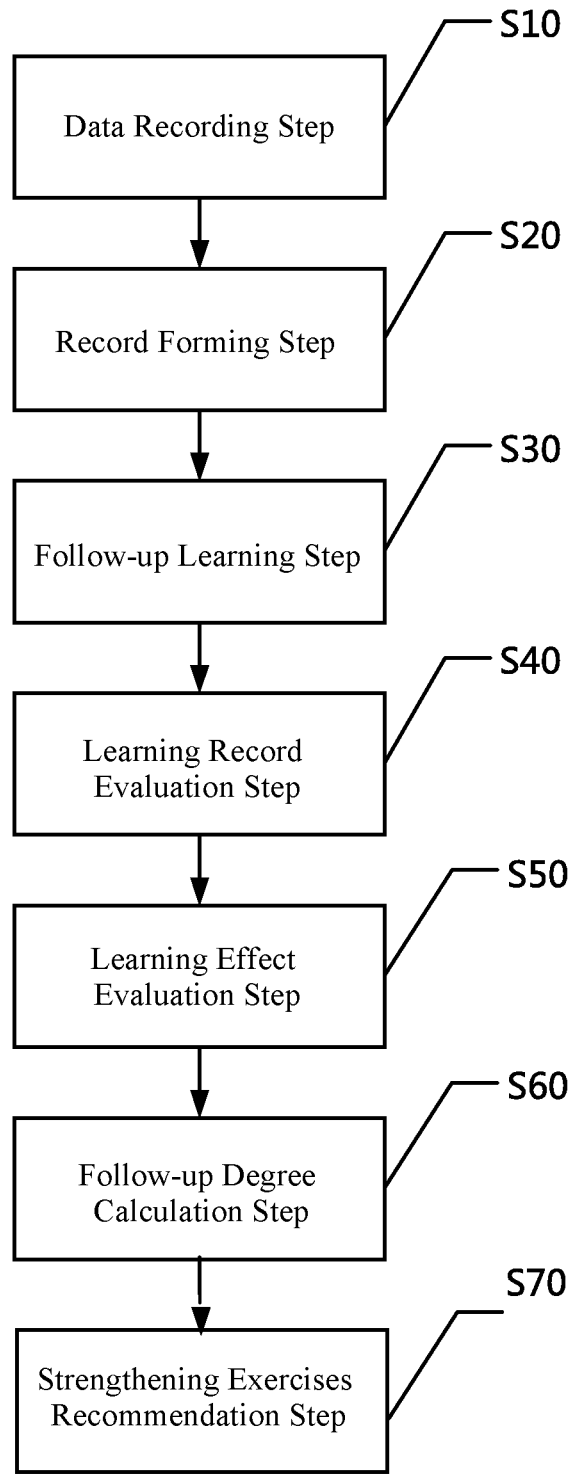
FIG. 3 is a schematic flowchart of an Internet-based recording/broadcasting method of the present invention.

FIG. 3 is a schematic flowchart of an Internet-based recording/broadcasting method of the present invention.

An embodiment of the Internet-based teaching recording/broadcasting method according to the present invention comprises: a data recording step S10, a record forming step S20, a follow-up learning step S30, a learning record evaluation step S40, a learning effect evaluation step S50, a follow-up degree calculation step S60, and a strengthening exercises recommendation step S70, with details as follows.

S10: The data recording step is used for recording learning data in a learning process of a particular user when carrying out review learning of a teaching recorded-for-broadcast course, the learning data comprising the learning content, the starting time and ending time, the duration, operation actions and answer results, etc.

For different users using the Internet-based teaching recording/broadcasting system, such as the user 200 and the particular user 300, the user 200 being referred to as a common user, after logging into the system through user terminals 201 and 301, various on-demand or review learning activities can be carried out mainly for teaching recorded-for-broadcast courses. Although reference numbers 200 and 300 are used here to refer to the user (the common user) and the particular user respectively, in fact, both types of users can be student users, and there is no substantial difference between them except for their follow-up learning relationship with each other. In addition, some particular users 300 may also act as common users 200 to follow other particular users for learning. The distinction here is only to indicate the relationship between the following and followed users.

When the user (the common user) is recommended or chosen to be a particular user, if he or she can also be confirmed, through the system, as a particular user to share learning records, he or she will officially become a particular user 300. The particular users 300 can be determined based on empirical data or historical data, usually users whose learning methods or academic performances are worth others learning, borrowing or following. The particular users 300 may be designated by teachers, selected by common users, self-recommended by users, recommended by analyzing historical learning records, etc., wherein same are generally users with good academic performances and/or high learning efficiencies.

In one example, before the data recording step is started, the recording/broadcasting system performs statistical analysis according to the past learning records and academic performances, that is big data analysis in which the main data analyzed are the learning time and academic performance data, whereby those excellent users can be screened out to form an excellent user recommendation list, and these excellent users are taken as particular users. When these users log into the recording/broadcasting system for learning, their learning data is recorded automatically to form a learning data record table. Whether based on empirical data or historical data, the users can be confirmed as particular users only if these data reach or meet a set threshold. As for the specific analysis method of big data, which is not the content of the present invention, the big data analysis methods in the prior art can perform such big data analysis and processing. For the confirmed particular users 300, attribute information about their introductions is added, such as assessment information about the learning ability, grade information about the academic performance, information about the learning efficiency, characteristics, advantages and so on.

In one example, a software of the user terminal 301 used by a particular user 300 can record or produce the learning data of the particular user 300 during the learning process. During recording or producing, a relevant record ID is firstly generated according to the recorded-for-broadcast courses learned by the particular user, and the learning contents, learning sequence, starting time and ending time, the duration, time distribution, operation actions, answer results and learning annotations of the particular user are automatically recorded. The learning contents are mainly the contents of a recorded-for-broadcast course, but also include other relevant learning contents, such as a certain formula, a certain pronunciation, a certain knowledge point, which is suspended on a certain learning page and queried through the recording/broadcasting system by a particular user during the process of learning. The residence time for each learning page is recorded. With respect to the operation actions such as pausing, returning, querying and the like, information about these operation actions is recorded and prompt information can be generated based on these actions, and if a particular user repeatedly returns at a place several times, it indicates that this place is really difficult or relatively important. Whether recorded by the recorded-for-broadcast course itself or usually accompanying the recorded-for-broadcast course, the user generally has to practice after learning the contents, including exercise practices, oral practices and so on. The results of the practices are recorded, such as correct and incorrect situations of the exercises, pronunciation situation of spoken language and so on. The learning annotation is information, such as marks, texts or patterns, recorded by the particular user at corresponding locations during the learning process, and these learning annotations can be displayed, according to the location information, to the common user who is carrying out the follow-up learning.

S20: the record forming step is used for forming, from the learning data recorded in the data recording step, a learning data record table that can be invoked and executed, and adding same after the recorded-for-broadcast course and then storing together on a teaching server.

The particular user 300 can record, by using a software client of the user terminal 301, relevant learning data of the particular user 300 during the learning process. These learning data include but not limited to the learning contents, the learning sequence, starting time and ending time, the duration, time distribution, exercise contents and answer results. It is recommended to include at least two of these types of information, and can include, in one example, all of the above information, and even can contain other possible recordable learning data which can be, in one example, learning experiences of text or audio/video, learning recommendation information and the like. Of course, all the information should be digital information that can be recorded by the particular user 300 using the user terminal 301. The learning data comprises learning annotations, the learning annotations being information, such as marks, texts or patterns, recorded by the user at corresponding locations during the learning process, and the learning annotations comprising the information, such as marks, texts or patterns, as well as location information corresponding to these pieces of information, wherein these learning annotations can be displayed, according to the location information, to the common user who is carrying out the follow-up learning. In one example, for particular after-class learning content, starting time and ending time of learning and the time of learning on the particular content can be recorded on a time axis so as to record the occurrence of a particular event. A follower can carry out follow-up learning according to such a time axis, that is, the learning data record table can be a usable spreadsheet identified in chronological order, for example, a TXT file is also feasible.

The user terminal 301 of the particular user 300 can form, from the above recorded relevant learning data, a learning data record table that can be invoked, such as a file in XML format, and store the learning data record table on a teaching server 500 together with a learned recorded course. The teaching server 500 may be on an Internet teaching server, can also be stored on a local teaching server or on a local area network teaching server. Optionally, the user terminal of the particular user 300 sends the recorded relevant learning data directly to the teaching server 500, and the teaching server 500 generates the learning data record table and saves same.

S30: The follow-up learning step is used for sharing the learning data record table to the common user, who can perform follow-up learning according to the learning data in the learning data record table.

For a user 200, when requesting to perform follow-up learning, he or she can provide personal requirement information to the system, wherein these pieces of information include but not limited to the personal information, learning stage, learning progress, academic performance, answers and so on; and the system will match these pieces of information with attribute information of particular users, thus generating a recommendation list from which the user can select an appropriate number of particular users to learn from them according to the particular users' learning data record table. In one example, when making a selection, the recommendation list generated by the system can be sent to a user 200, a third party user related to the user 200, such as his teacher user 100 or parent user 400, or a friend or student user 200 who is selected by the user and from whom the user wishes to get help in making a decision.

The user 200 can share, after selecting a particular user 300, his learning records and start the follow-up learning. When performing the follow-up learning, the user 200 can set corresponding reminders, for example, when the particular user 300 starts learning, a reminder message will be sent to the user 200. The user 200 can provide real time, delayed or post follow-up to the common user, and the common user can perform follow-up learning according to the relevant learning data recorded in the learning data record table. In one example, the relevant learning data recorded in the data recording steps can be shared synchronously to the common user so that the common user can carry out follow-up learning in real time; the follow-up learning data can be moderately delayed so that the common user can carry out follow-up learning; alternatively, after the particular user completes the learning, a complete learning data record table is formed, and then the common user performs follow-up learning.

In practical applications, the so-called logging into the recording/broadcasting system for learning mainly refers to the users self-learning after class, especially the after-class review, out-of-class learning, etc., which has more practical significance of follow-up learning, because the learning in class is basically simultaneous and synchronous for everyone, generally there is no need for follow-up learning. The main purpose of the present invention is to solve the problem of follow-up learning in self-learning out of class, but it does not exclude the follow-up learning in class, which in one example can be the case where some user in a class learns from particular users in other classes through the Internet-based teaching recording/broadcasting system.

S40: The learning record evaluation step is used for evaluating the learning data record table by the common user after completing the follow-up learning according to the learning data record table.

In one example, the user 200 can also perform learning record evaluation for evaluating the learning data record table according to the user 200's own feelings, after completing the learning according to the learning data record table. The evaluation can be a score or a star grade, but also can be a text, audio or video evaluation. These evaluations can be fed back to the particular user 300, and the particular user 300 can choose to browse or view these pieces of information. Relevant learning data, such as the situation of solving exercises, of the user who performs follow-up learning also can be sent to the particular user 300 so as to enable the particular user 300 to know his or her own advantages, thus helping the particular user 300 to define the goal for further improvement.

S50: The learning effect evaluation step is used for forming, by the common user, his or her own learning data record table after completing the follow-up learning according to the learning data record table, and by comparing same with the learning data recorded in the learning data record table for which the follow-up learning is carried out, finding out differences from the particular user, including an overall difference in learning time, a difference in the allocation of learning time, a difference in accuracies, and differences in wrongly-answered exercises, etc.

In one example, the learning effect of the user 200 can also be evaluated, so that after completing the follow-up learning according to the learning data record table, the user 200 first forms his or her own learning data record table, which can be saved locally in the user terminal 201 and also can be uploaded to the teaching server 500, and then, by comparing same with relevant learning data recorded in the learning data record table of the particular user 300, the user finds out differences from the particular user, such as the difference in learning times to complete the same learning content, the difference in completing the same exercise, the difference in accuracies, the difference in particular wrongly-answered exercises, etc. Furthermore, the teaching server 500 evaluates the effect of the follow-up learning by the user 200 over a period of time based on information in the learning data record table.

S60: The follow-up degree calculation step is used for obtaining a follow-up degree parameter with respect to the learning data of the particular user through analysis of the learning effect evaluation of the common user within a period of time, and determining whether the follow-up learning is an effective follow-up in combination with a change in the academic performance of the common user during this period of time.

The follow-up degree calculation step is used for determining the follow-up learning to be an effective follow-up if the follow-up degree parameter continually gets better and the academic performance continually gets better, otherwise, determining the follow-up learning to be a non-effective follow-up, and when determining the follow-up to be the non-effective follow-up, providing a suggestion to replace the follow-up for the common user.

The follow-up degree parameter is calculated according to the following equation, $$S = 1 - \sum_{i}^{n} \left( \delta_1 \left( \frac{|T_1 - t_1|}{T_1} \right) + \ldots + \delta_i \left( \frac{|T_i - t_i|}{T_i} \right) \right),$$

i=1, 2, 3, ..., n, where n is a positive integer representing the $i^{th}$ marked event in the learning data record table, T represents the corresponding time of the $i^{th}$ marked event in the learning data record table of the particular user, t represents the corresponding time of the $i^{th}$ marked event in the learning data record table of the common user, and $\delta$ represents the weight coefficient of the $i^{th}$ marked event, where $\delta_1 + \ldots + \delta_i = 1$, with the marked event being an event such as learning a page, pausing, returning, solving exercises and so on.

Before the follow-up learning is started, a certain amount of fees are paid in advance according to an agreement of an offer, and after the period of time of the follow-up learning is completed, an actual payment will be incurred in the case where the learning is determined to be effective follow-up learning, while a small amount of payment will be incurred in the case of non-effective follow-up learning.

S70: The strengthening exercises recommendation step is used for recommending, according to the differences in the wrongly-answered exercises, other exercises of the same kind as the wrongly-answered exercises to the common user so as to further strengthen the learning.

In one example, the recording/broadcasting system of the present invention can retrieve and extract relevant exercises from an exercise library of the system according to the difference situation of the wrongly-answered exercises and according to the topic involved in the wrongly-answered exercises (exercises that the particular user 300 did not solve wrongly but the user 200 solved wrongly), and recommends, to the common user, relevant exercises of the relevant topic involved in the strengthening learning so as to strengthen the learning and make an improvement. The main concern herein is some of the exercises that the particular user 300 did not solve wrongly but the user 200 who performs follow-up learning solved wrongly. Exercises that both users solved wrongly can be left aside temporarily, which mainly reflects the limit and advancement of learning goals. For the contents that the student with the better academic performance has not grasped, the user, as a follower, may temporarily pay no attention to this, and priority should be give to solving the current difference problem. Of course, this kind of consideration is only a preferred way or a conventional processing way. A plurality of exercises for strengthening the learning can also be retrieved and recommended according to the topic of all the wrongly-answered exercises.

In a preferred example, a feedback step is also included, which is used for forming a difference report from the content difference in the learning data record table of the user 200 after following the particular user 300 for learning, such as situations of the learning time and the different wrongly-answered exercises, and feeds same back to the teacher or parents so as to facilitate specialized strengthening and guidance.

Preferred embodiments of the present invention introduced above are intended to make the spirit of the present invention more apparent and easy to understand, but not to limit the present invention. Any modifications, replacements and improvements made within the spirit and principles of the present invention should be regarded as within the scope of protection of the claims of the present invention.

INDUSTRIAL APPLICABILITY

In an Internet-based follow-up learning system and method for a recorded-for-broadcast course provided in the present application, through the recording and sharing, by a particular user, of the process learning data of the recorded-for-broadcast courses, the problem that follow-up learning cannot be carried out among users in the process of reviewing the recorded-for-broadcast courses is solved, thereby helping to share learning methods among users, helping users to develop good learning habits, and helping users to improve learning efficiencies.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An Internet-based follow-up learning method for a recorded-for-broadcast course, executed by a processor, comprising the following steps:

a data recording step for recording learning data in a learning process of a particular user when carrying out review learning of a teaching recorded-for-broadcast course, the learning data including learning contents, starting time and ending time, a duration, operation actions and answer results;

a record forming step for forming, from the learning data recorded in the data recording step, a learning data record table that can be invoked and executed, and storing same on a teaching server together with the recorded-for-broadcast course;

a follow-up learning step in which a common user can invoke the learning data record table when carrying out the review learning of the recorded-for-broadcast course, and carry out follow-up learning according to the learning data recorded in the learning data record table;

a follow-up learning comparison step for forming, by the common user, his or her own learning data record table after completing the follow-up learning according to the learning data record table, and by comparing same with the learning data recorded in the learning data record table for which the follow-up learning is carried out, finding out differences from the particular user, including an overall difference in learning time, a difference in the allocation of learning time, a difference in accuracies, and differences in wrongly-answered exercises;

a feedback step providing feedback from the common user after following the particular user for learning to a parent user and/or a teacher user to update the data recording step and recording forming step;

a follow-up degree calculation step for obtaining a follow-up degree parameter with respect to the learning data of the particular user through analysis of the learning effect evaluation of the common user within a period of time, and determining whether the follow-up learning is an effective follow-up in combination with a change in the academic performance of the common user during this period of time;

a generation step for generating a list of users for learning recommended to the common user and a strengthening exercises recommendation step of recommending, according to the differences in the wrongly-answered exercises, other exercises of the same kind as the wrongly-answered exercises to the common user so as to further strengthen the learning;

repeating the date record step to the generating step to perform big data analysis to achieve a best recommendation user list, wherein the common user can be confirmed as particular users only if a set threshold is met, wherein the common user, the parent and/or the teacher user are connected to a teaching server via the Internet through user terminals installed with software clients, respectively; the teacher user carries out Internet-based teaching activities by connecting one of the user terminals to a recording device of a multimedia class and realizes a task of recording the multimedia class; and each of the user terminal comprises a processor, a network module, a control module, a display module, an intelligent operating system.

2. The method of claim 1, wherein the follow-up degree calculation step is used for determining the follow-up learning to be an effective follow-up if the follow-up degree parameter continually gets better and the academic performance continually gets better, otherwise, determining the follow-up learning to be a non-effective follow-up, and when determining the follow-up to be the non-effective follow-up, providing a suggestion to replace the follow-up for the common user.

3. The method of claim 2, further comprising:

a particular user confirmation step of confirming the identity of the particular user according to historical data or empirical data after comparison with a set threshold, the empirical data including empirical data designated by a teacher, selected by the common user and recommended by the user himself/herself, the historical data being historical learning records, and the particular user preferably being a user with good academic performance and/or high learning efficiency.

4. The method of claim 3, wherein the learning process is the user's self-learning process, in particular after-class review and out-of-class learning, and the learning data record table is an XML file.

5. The method of claim 4, wherein the follow-up learning comprises at least one of real-time follow-up, delayed follow-up and post-follow-up.

6. The method of claim 5, wherein the learning data comprises learning annotations, the learning annotations being information, including marks, texts or patterns, recorded by the user at corresponding locations during the learning process, and the learning annotations comprising the information, including marks, texts or patterns, as well as location information corresponding to these pieces of information, wherein these learning annotations can be displayed, according to the location information, to the common user who is carrying out the follow-up learning.

7. The method of claim 6, further comprising:

a learning record evaluation step for evaluating the learning data record table by the common user after completing the follow-up learning according to the learning data record table.

8. The method of claim 7, wherein in the follow-up learning step, the common user provides his or her own requirement information, and according to the match of the requirement information with the attributes of particular users, a list of particular users recommended to the common user is formed, from which the common user can select at least one particular user's learning data record table.

9. The method of claim 8, wherein when the common user makes a selection, the list of particular users can be sent to the teacher of the user, a third party user related to the user, or a user who is selected by the common user and from whom the common user wishes to get help in making a decision, and the selection can be made with the help of the third party.

10. The method of claim 9, wherein before the follow-up learning is started, a certain amount of fees are paid in advance according to an agreement of an offer, and after the period of time of the follow-up learning is completed, an actual payment will be incurred in the case where the learning is determined to be effective follow-up learning, while a small amount of payment will be incurred in the case of non-effective follow-up learning.

11. An Internet teaching system comprising a processor and a memory, which is used to implement the method:

a data recording step for recording learning data in a learning process of a particular user when carrying out review learning of a teaching recorded-for-broadcast course, the learning data including learning contents, starting time and ending time, a duration, operation actions and answer results;

a record forming step for forming, from the learning data recorded in the data recording step, a learning data record table that can be invoked and executed, and storing same on a teaching server together with the recorded-for-broadcast course;

a follow-up learning step in which a common user can invoke the learning data record table when carrying out the review learning of the recorded-for-broadcast course, and carry out follow-up learning according to the learning data recorded in the learning data record table;

a feedback step providing feedback from the common user after following the particular user for learning to a parent user and/or a teacher user to update the data recording step and recording forming step;

a follow-up learning comparison step for forming, by the common user, his or her own learning data record table after completing the follow-up learning according to the learning data record table, and by comparing same with the learning data recorded in the learning data record table for which the follow-up learning is carried out, finding out differences from the particular user, including an overall difference in learning time, a difference in the allocation of learning time, a difference in accuracies, and differences in wrongly-answered exercises; and a follow-up degree calculation step for obtaining a follow-up degree parameter with respect to the learning data of the particular user through analysis of the learning effect evaluation of the common user within a period of time, and determining whether the follow-up learning is an effective follow-up in combination with a change in the academic performance of the common user during this period of time;

a generation step for generating a list of users for learning recommended to the common user and a strengthening exercises recommendation step of recommending according to the differences in the wrongly-answered exercises, other exercises of the same kind as the wrongly-answered exercises to the common user so as to further strengthen the learning; and repeating the date record step to the generating step to perform big data analysis to achieve a best recommendation user list, wherein the common user can be confirmed as particular users only if a set threshold is met, wherein the common user, the parent and/or the teacher user are connected to a teaching server via the Internet through user terminals installed with software clients, respectively; the teacher user carries out Internet-based teaching activities by connecting one of the user terminals to a recording device of a multimedia class and realizes a task of recording the multimedia class; and each of the user terminal comprises a processor, a network module, a control module, a display module, an intelligent operating system.

12. A non-transitory computer storage medium, storing a program which can be executed by a computer, wherein the program, when executed, can implement the steps of the method:

a data recording step for recording learning data in a learning process of a particular user when carrying out review learning of a teaching recorded-for-broadcast course, the learning data including learning contents, starting time and ending time, a duration, operation actions and answer results;

a record forming step for forming, from the learning data recorded in the data recording step, a learning data record table that can be invoked and executed, and storing same on a teaching server together with the recorded-for-broadcast course;

a follow-up learning step in which a common user can invoke the learning data record table when carrying out the review learning of the recorded-for-broadcast course, and carry out follow-up learning according to the learning data recorded in the learning data record table;

a feedback step providing feedback from the common user after following the particular user for learning to a parent user and/or a teacher user to update the data recording step and recording forming step;

a follow-up learning comparison step for forming, by the common user, his or her own learning data record table after completing the follow-up learning according to the learning data record table, and by comparing same with the learning data recorded in the learning data record table for which the follow-up learning is carried out, finding out differences from the particular user, including an overall difference in learning time, a difference in the allocation of learning time, a difference in accuracies, and differences in wrongly-answered exercises, etc.; and a follow-up degree calculation step for obtaining a follow-up degree parameter with respect to the learning data of the particular user through analysis of the learning effect evaluation of the common user within a period of time, and determining whether the follow-up learning is an effective follow-up in combination with a change in the academic performance of the common user during this period of time;

a generation step for generating a list of users for learning recommended to the common user and a strengthening exercises recommendation step of recommending according to the differences in the wrongly-answered exercises, other exercises of the same kind as the wrongly-answered exercises to the common user so as to further strengthen the learning; and repeating the date record step to the generating step to perform big data analysis to achieve a best recommendation user list, wherein the common user can be confirmed as particular users only if a set threshold is met, wherein the common user, the parent and/or the teacher user are connected to a teaching server via the Internet through user terminals installed with software clients, respectively; the teacher user carries out Internet-based teaching activities by connecting one of the user terminals to a recording device of a multimedia class and realizes a task of recording the multimedia class; and each of the user terminal comprises a processor, a network module, a control module, a display module, an intelligent operating system.

13. The Internet teaching system of claim 11, wherein the follow-up degree calculation step is used for determining the follow-up learning to be an effective follow-up if the follow-up degree parameter continually gets better and the academic performance continually gets better, otherwise, determining the follow-up learning to be a non-effective follow-up, and when determining the follow-up to be the non-effective follow-up, providing a suggestion to replace the follow-up for the common user;

wherein the method further comprises a particular user confirmation step of confirming the identity of the particular user according to historical data or empirical data after comparison with a set threshold, the empirical data including empirical data designated by a teacher, selected by the common user and recommended by the user himself/herself, the historical data being historical learning records, and the particular user preferably being a user with good academic performance and/or high learning efficiency;

wherein the learning process is the user's self-learning process, in particular after-class review and out-of-class learning, and the learning data record table is an XML file;

wherein the follow-up learning comprises at least one of real-time follow-up, delayed follow-up and post-follow-up;

wherein the learning data comprises learning annotations, the learning annotations being information, including marks, texts or patterns, recorded by the user at corresponding locations during the learning process, and the learning annotations comprising the information, including marks, texts or patterns, as well as location information corresponding to these pieces of information, wherein these learning annotations can be displayed, according to the location information, to the common user who is carrying out the follow-up learning;

wherein the method further comprises: a learning record evaluation step for evaluating the learning data record table by the common user after completing the follow-up learning according to the learning data record table, and a strengthening exercises recommendation step of recommending, according to the differences in the wrongly-answered exercises, other exercises of the same kind as the wrongly-answered exercises to the common user so as to further strengthen the learning;

wherein in the follow-up learning step, the common user provides his or her own requirement information, and according to the match of the requirement information with the attributes of particular users, a list of particular users recommended to the common user is formed, from which the common user can select at least one particular user's learning data record table;

wherein when the common user makes a selection, the list of particular users can be sent to the teacher of the user, a third party user related to the user, or a user who is selected by the common user and from whom the common user wishes to get help in making a decision, and the selection can be made with the help of the third party; and wherein before the follow-up learning is started, a certain amount of fees are paid in advance according to an agreement of an offer, and after the period of time of the follow-up learning is completed, an actual payment will be incurred in the case where the learning is determined to be effective follow-up learning, while a small amount of payment will be incurred in the case of non-effective follow-up learning.

14. The computer storage medium of claim 12, wherein the follow-up degree calculation step is used for determining the follow-up learning to be an effective follow-up if the follow-up degree parameter continually gets better and the academic performance continually gets better, otherwise, determining the follow-up learning to be a non-effective follow-up, and when determining the follow-up to be the non-effective follow-up, providing a suggestion to replace the follow-up for the common user;

Wherein the method further comprises a particular user confirmation step of confirming the identity of the particular user according to historical data or empirical data after comparison with a set threshold, the empirical data including empirical data designated by a teacher, selected by the common user and recommended by the user himself/herself, the historical data being historical learning records, and the particular user preferably being a user with good academic performance and/or high learning efficiency;

wherein the learning process is the user's self-learning process, in particular after-class review and out-of-class learning, and the learning data record table is an XML file;

wherein the follow-up learning comprises at least one of real-time follow-up, delayed follow-up and post-follow-up;

wherein the learning data comprises learning annotations, the learning annotations being information, including marks, texts or patterns, recorded by the user at corresponding locations during the learning process, and the learning annotations comprising the information, including marks, texts or patterns, as well as location information corresponding to these pieces of information, wherein these learning annotations can be displayed, according to the location information, to the common user who is carrying out the follow-up learning;

wherein the method further comprises: a learning record evaluation step for evaluating the learning data record table by the common user after completing the follow-up learning according to the learning data record table, and a strengthening exercises recommendation step of recommending, according to the differences in the wrongly-answered exercises, other exercises of the same kind as the wrongly-answered exercises to the common user so as to further strengthen the learning;

wherein in the follow-up learning step, the common user provides his or her own requirement information, and according to the match of the requirement information with the attributes of particular users, a list of particular users recommended to the common user is formed, from which the common user can select at least one particular user's learning data record table;

wherein when the common user makes a selection, the list of particular users can be sent to the teacher of the user, a third party user related to the user, or a user who is selected by the common user and from whom the common user wishes to get help in making a decision, and the selection can be made with the help of the third party; and wherein before the follow-up learning is started, a certain amount of fees are paid in advance according to an agreement of an offer, and after the period of time of the follow-up learning is completed, an actual payment will be incurred in the case where the learning is determined to be effective follow-up learning, while a small amount of payment will be incurred in the case of non-effective follow-up learning.

\* \* \* \* \*